US010924943B2

(12) United States Patent
Chou et al.

(10) Patent No.: US 10,924,943 B2
(45) Date of Patent: Feb. 16, 2021

(54) INSTANTIATION AND MANAGEMENT OF PHYSICAL AND VIRTUALIZED NETWORK FUNCTIONS OF A RADIO ACCESS NETWORK NODE

(71) Applicant: Apple Inc., Cupertino, CA (US)

(72) Inventors: Joey Chou, Scottsdale, AZ (US); Yizhi Yao, Chandler, AZ (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/475,621

(22) PCT Filed: Dec. 26, 2017

(86) PCT No.: PCT/US2017/068435
§ 371 (c)(1),
(2) Date: Jul. 2, 2019

(87) PCT Pub. No.: WO2018/128875
PCT Pub. Date: Jul. 12, 2018

(65) Prior Publication Data

US 2019/0327621 A1 Oct. 24, 2019

Related U.S. Application Data

(60) Provisional application No. 62/442,876, filed on Jan. 5, 2017.

(51) Int. Cl.
*H04W 24/02* (2009.01)
*H04L 12/24* (2006.01)

(52) U.S. Cl.
CPC ............. *H04W 24/02* (2013.01); *H04L 41/04* (2013.01)

(58) Field of Classification Search
CPC .... H04W 24/02; H04L 41/04; H04L 41/0896; H04L 41/0886
See application file for complete search history.

(56) References Cited

U.S. PATENT DOCUMENTS

2017/0078143 A1* 3/2017 Zhao ....................... H04L 41/04
2018/0287894 A1* 10/2018 Senarath ............. H04L 41/5054

(Continued)

OTHER PUBLICATIONS

3GPP TR 32.842, "3rd Generation Partnership Project; Technical Specification Group Services and System Aspects; Telecommunication management; Study on network management of virtualized networks (Release 13)", V13.1.0, Dec. 2015, 84 pages.

(Continued)

*Primary Examiner* — Asghar H Bilgrami
(74) *Attorney, Agent, or Firm* — Stoel Rives LLP

(57) ABSTRACT

A network management function (NMF) is configured to instantiate a network service (NS), update a NS, and/or establish a relation between a virtualized network function (VNF) instance and a physical network function (PNF) instance. The NMF may instantiate, for example, a NS including a new VNF that is part of a base station or a g Node B (gNB), a NS including a PNF that is part of the gNB, or a NS that includes a PNF and a new VNF that form a gNB. The NMF may also, for example, update a NS to add a VNF instance to a NS that already includes a PNF instance to form a gNB, or update a NS to add a PNF instance to a NS that already includes a VNF instance to form a gNB.

26 Claims, 11 Drawing Sheets

100
102
CU
(Upper layer of NR BS)
104
CU
(Upper layer of NR BS)
DU
(Lower layer of NR BS)
108

101
106
CU
(Upper layer of NR BS)
DU
(Lower layer of NR BS)
110
DU
(Lower layer of NR BS)
112

(56) References Cited

U.S. PATENT DOCUMENTS

2019/0149434 A1* 5/2019 Chou .................. H04L 41/0813
370/254
2019/0260636 A1* 8/2019 Sun ....................... H04L 41/082

OTHER PUBLICATIONS

3GPP TR 32.864, "3rd Generation Partnership Project; Technical Specification Group Services and System Aspects; Telecommunication management; Study on management aspects of virtualized network functions that are part of the New Radio (NR) (Release 15)", V0.1.0, Nov. 2016, 8 pages.

3GPP TS 28.525, "3rd Generation Partnership Project; Technical Specification Group Services and System Aspects; Telecommunication management; Life Cycle Management (LCM) for mobile networks that include virtualized network functions; Requirements (Release 14)", V1.1.0, Nov. 2016, 47 pages.

3GPP TS 28.526, "3rd Generation Partnership Project; Technical Specification Group Services and System Aspects; Telecommunication management; Life Cycle Management (LCM) for mobile networks that include virtualized network functions; Procedures (Release 14)", V0.3.0, Nov. 2016, 18 pages.

ETSI GS NFV-IFA 013, "Network Functions Virtualisation (NFV); Management and Orchestration; Os-Ma-Nfvo reference point—Interface and Information Model Specification", V2.1.1, Oct. 2016, 127 pages.

PCT/US2017/068435, International Search Report and Written Opinion, dated May 17, 2018, 21 pages.

* cited by examiner

200
NFV Orchestrator (NFVO) 212
VNF Manager (VNFM) 206
Virtualized Infrastructure Manager (VIM) 202
NFV-MANO 232
Or-Vi
Or-Vnfm
Vi-Vnfm
Os-Ma-nfvo
Ve-Vnfm-em
Ve-Vnfm-vnf
Nf-Vi
222 OSS/BSS
NM 214
EM 210
VNF 208
VN-Nf
Vn-Nf
NFVI 204
Itf-N
DM 226
3GPP Management System 230
NE (PNF) 224

INSTANTIATION AND MANAGEMENT OF PHYSICAL AND VIRTUALIZED NETWORK FUNCTIONS OF A RADIO ACCESS NETWORK NODE

RELATED APPLICATIONS

This application claims the benefit under 35 U.S.C. § 119(e) of U.S. Provisional Patent Application No. 62/442,876, filed Jan. 5, 2017, which is hereby incorporated by reference herein in its entirety.

TECHNICAL FIELD

Various embodiments may relate to the field of wireless communications. More particularly, this disclosure is directed to virtualized network functions that are part of a radio access network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station (BS) can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) or next generation (NG) wireless RANs, RAN Nodes, named as NG-RAN nodes, can include a 5G Node, new radio (NR) node or NR BS, or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION OF PREFERRED EMBODIMENTS

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Embodiments disclosed herein are directed to management aspects of virtualized network functions (VNFs), and certain examples are provided for the management of VNFs that are part of new radio access networks (e.g., 5G). Skilled persons will recognize from the disclosure herein, however, that certain embodiments may be applicable to both gNB and other types of RAN nodes.

Certain NR BS deployments use a function split feature that splits a gNB into one or more centralized unit (CU) (upper layer of NR BS) and one or more distributed unit (DU) (lower layer NR BS). NR allows CU deployment with network function virtualization (NFV). Thus, for example, a gNB may comprise a CU that is implemented as VNF running in the cloud and a DU running in a cell site that provides wireless communication to a UE.

Figures 1A, 1B:
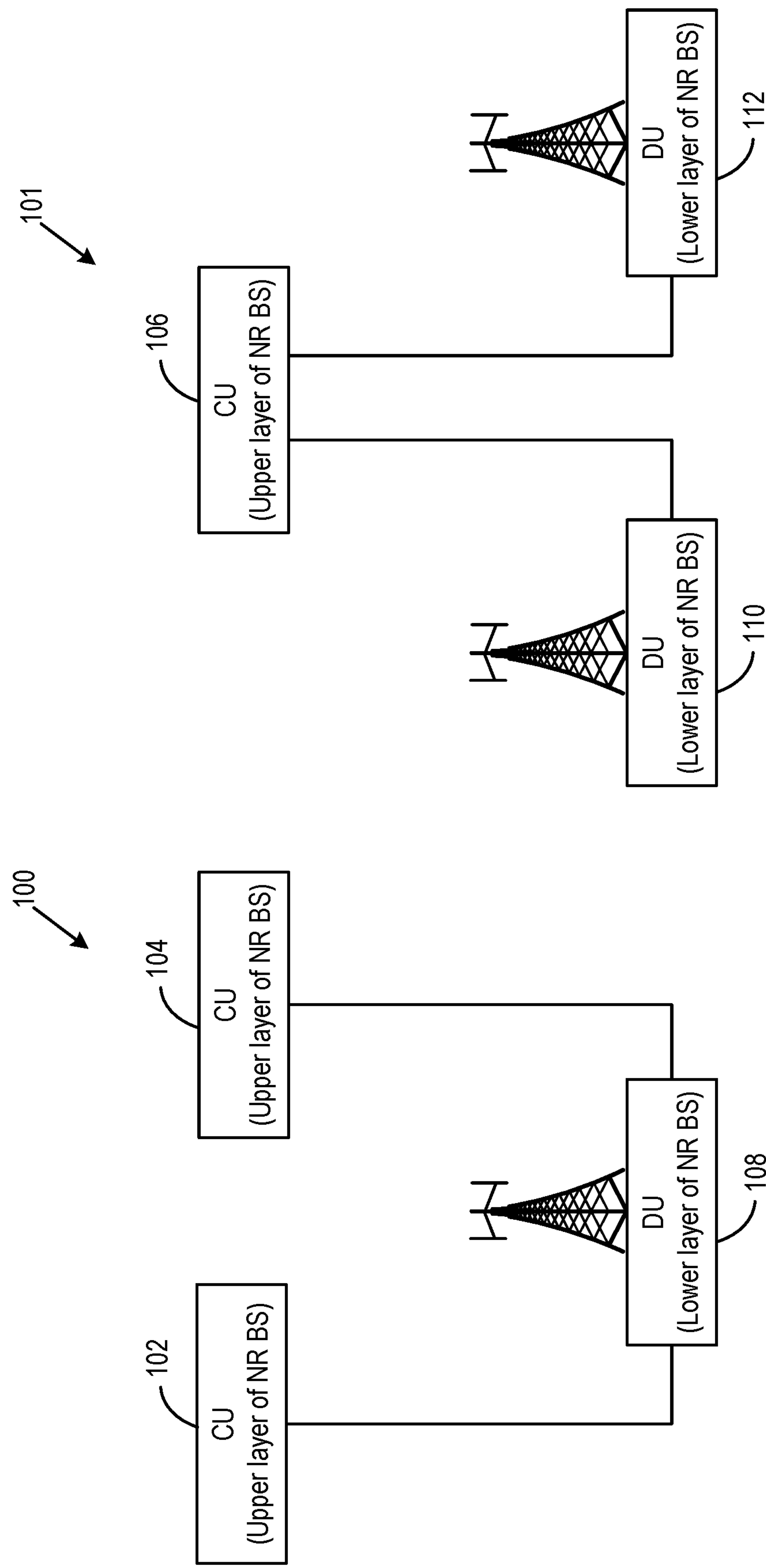
FIGS. 1A and 1B are block diagrams illustrating new radio access network architectures with a functional split between upper layers and lower layers of NR stacks according to certain embodiments.

A CU may be connected to one or more DU. A DU may be connected to one or more CU. For example, FIGS. 1A and 1B are block diagrams illustrating new radio access network architectures that include upper layers and lower layers of NR stacks according to certain embodiments. In the example shown in FIG. 1A, a first CU 102 and a second CU 104 are part of a first NR BS 100 (e.g., gNB) that includes a DU 108. In the example shown in FIG. 1B, a first DU 110 and a second DU 112 are part of a second NR BS 101 (e.g., gNB) that includes a CU 106. In both examples, the CUs 102, 104, 106 are implemented as VNF (e.g., running in the cloud) and the DUs 108, 110, 112 run in a respective cell site that provides wireless communication to UEs.

The functional split between the CU and DU of gNB nodes may depend on the transport layer. High performance transport between the CU and DU of gNB nodes, e.g., optical networks, can enable advanced coordinated multi-point (CoMP) schemes and scheduling optimization, which could be useful in high capacity scenarios, or scenarios where cross cell coordination is beneficial. Low performance transport between the CU and BU of gNB nodes can enable the higher protocol layers of the NR radio stacks to be supported in the CU, since the higher protocol layers have lower performance requirements on the transport layer in terms of bandwidth, delay, synchronization and jitter.

Certain embodiments herein relate to life cycle management functions to instantiate a network service (NS) to include VNF and physical network function (PNF) that form a gNB.

In an example embodiment, an apparatus includes an NR RAN node or gNB including a CU (i.e., upper layer of NR BS) that may be implemented as VNF deployed in the cloud, and a DU (i.e., lower layer of NR BS) that may be implemented as vertical hardware deployed in a cell site to provide wireless communication to UE. In certain such embodiments, a gNB may include a CU connected to one or more DUs. In addition, or in other embodiments, a gNB may include a DU connected to one or more CUs.

In another example embodiment, a network management function (NMF) that may be supported by one or more processors to send a request to an NFV orchestrator (NFVO) to create a new NS identifier, receive from NFVO the new NS identifier, send a request to the NFVO to instantiate a NS that includes the instantiation of a new VNF to implement a CU that is part of a gNB, send a request to the NFVO to instantiate a NS that includes a PNF to implement a DU that is part of the gNB, send a request to NFVO to instantiate a NS that includes the instantiation of a new VNF and addition of a PNF to form the gNB, receive from the NFVO the operation result including the lifecycle operation occurrence identifier, receive from the NFVO the NS lifecycle change notification to the NMF indicating the start of NS instantiation, and receive from the NFVO a NS lifecycle change notification to the NMF indicating the result of the NS instantiation. In certain such embodiments, the request to instantiate a NS that includes the instantiation of a new VNF contains attributes (e.g., additionalParamForVnf) to provide additional parameter(s) per VNF instance that are used for VNF instantiation. The request to instantiate a NS that contains a PNF may also include attributes (e.g., pnfInfo) to provide the information of PNF to be added to the NS instance.

In another example embodiment, an NMF that may be supported by one or more processors to send a request to an NFVO to update a NS to add a VNF instance, send a request to the NFVO to update a NS to add a PNF instance, receive from the NFVO the operation result including the lifecycle operation occurrence identifier, receive from the NFVO the NS lifecycle change notification to the NMF indicating the start of NS update, and receive from the NFVO the NS lifecycle change notification to the NMF indicating the result of NS update. In certain such embodiment, the request to update a NS that adds a VNF instance includes attributes 1) nsInstanceId that identifies the NS instance where the VNF instance is to be added, and 2) addVnfInstance that provides the existing instance to be added to the NS instance. In certain embodiments, the request to update a NS that adds a PNF instance may include attributes 1) nsInstanceId that identifies the NS instance where the VNF instance is to be added, and 2) pnfInfo that provides the information of PNF to be added to the NS instance.

In another example embodiment, an NMF that may be supported by one or more processors to send a request to an network function management function (NFMF) to establish a relation between network function instances that are virtualized and network function instances that are non-virtualized, receive a response from the NFMF indicating that the relation between network function instances that are virtualized and network function instances that are non-virtualized has been established, and/or receive a response from the NFMF indicating that the relation of network function instance that is virtualized and network function that is non-virtualizesd cannot be established. In certain such embodiments, the VNF instance has been instantiated, and a managed object instance (MOI) representing the network function instance that is virtualized has been created. The PNF instance may be deployed and the MOI representing the network function instance that is non-virtualized may have been created. In certain embodiments, the relation between network function instance that is virtualized and network function instance that is non-virtualized indicates that the network function instance that is virtualized and network function instance that is non-virtualized are used to form a gNB. One network function instance that is virtualized may have relations with one or more network function instances that are non-virtualized. Alternatively, one network function instance that is non-virtualized may have relations with one or more network function instances that are virtualized. In certain embodiments, the NMF knows which network function instance that is virtualized and network function instance that is non-virtualized can be used to form a gNB such that the relation between them can be established. In certain embodiments, the NFMF validates the relation between network function instance that is virtualized and network function instance that is non-virtualized. If the relation is valid, the NFMF is to configure the network function instance that is virtualized and network function instance that is non-virtualized to establish the relation, and send a response to the NMF indicating the relation has been established. If the relation is invalid, on the other hand, the NFMF is to send a response to the NMF indicating the relation cannot be established.

Certain embodiments include an apparatus comprising means to perform one or more elements of a method described in or related to any of the examples described herein.

Certain embodiments include one or more non-transitory computer-readable media comprising instructions to cause an electronic device, upon execution of the instructions by one or more processors of the electronic device, to perform one or more elements of a method described in or related to any of the examples described herein.

Certain embodiments include an apparatus comprising logic, modules, and/or circuitry to perform one or more elements of a method described in or related to any of the examples described herein.

Certain embodiments include a method, technique, or process as described in or related to any of the examples, or portions or parts thereof.

Certain embodiments include an apparatus comprising one or more processors and one or more computer readable media comprising instructions that, when executed by the one or more processors, cause the one or more processors to perform the method, techniques, or process as described in or related to any of examples, or portions thereof.

Certain embodiments include a method of communicating in a wireless network as shown and described herein.

Certain embodiments include a system for providing wireless communication as shown and described herein.

Certain embodiments include a device for providing wireless communication as shown and described herein.

In some embodiments, virtualized can be spelled as virtualised herein, however the meaning is the same.

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 2A:
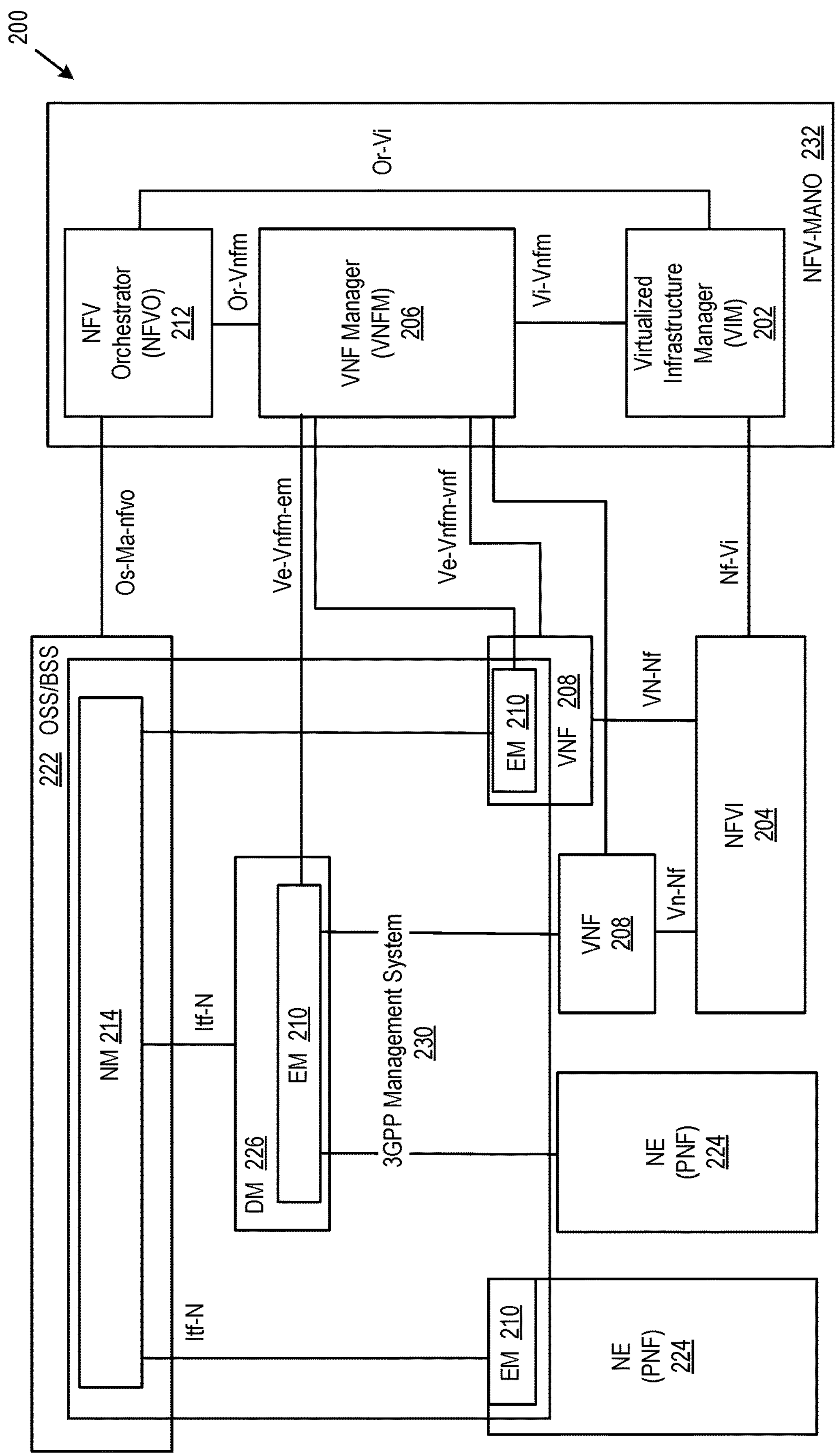
FIG. 2A is a diagram illustrating a network management architecture for mobile networks that include virtualized network functions which can be part of EPC or IMS according to certain embodiments.

FIG. 2A is a diagram illustrating a network management architecture 200 for mobile networks that include virtualized network functions (VNFs or network function virtualization (NFV) more generally) which can be part of EPC and IMS. The illustrated network management architecture 200 is provided by way of example only and skilled persons will recognize from the disclosure herein that the described embodiments may also be used with other virtualized network architectures. The components shown in FIG. 2A, according to some example embodiments, can support NFV. The system 200 is illustrated as including a virtualized infrastructure manager (VIM) 202, a network function virtualization infrastructure (NFVI) 204, a VNF manager (VNFM) 206, virtualized network functions (VNFs) 208, an element manager (EM) 210, an NFV orchestrator (NFVO) 212, and a network manager (NM) 214 within an operation support system/business support system (OSS/BSS) 222.

The VIM 202 manages the resources of the NFVI 204. The NFVI 204 can include physical or virtual resources and applications (including hypervisors) used to execute the system 200. The VIM 202 may manage the life cycle of virtual resources with the NFVI 204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 206 may manage the VNFs 208. The VNFs 208 may be used to execute IP multimedia subsystem (IMS), evolved packet core (EPC) and 5G (5GC and NG-RAN) components/functions. The VNFM 206 may manage the life cycle of the VNFs 208 and track performance, fault and security of the virtual aspects of VNFs 208. The EM 210 may track the performance, fault and security of the functional aspects of VNFs 208 and physical network functions (PNFs) 224. The tracking data from the VNFM 206 and the EM 210 may comprise, for example, performance measurement (PM) data used by the VIM 202 or the NFVI 204. Both the VNFM 206 and the EM 210 can scale up/down the quantity of VNFs 208 of the system 200. In some embodiments, the EM 210 is responsible for fault, configuration, accounting, performance and security management (FCAPS). In other embodiments, the EM 210 can manage multiple VNFs 208 or multiple EMs 210 manage a single VNF 208 each. In an embodiment, the EM 210 can be a VNF 208 itself. In an embodiment, the combination of the NM 214, a domain manager (DM) 226 and/or the EM 210 is considered to be a third generation partnership project (3GPP) management system.

The NFVO 212 may coordinate, authorize, release and engage resources of the NFVI 204 in order to provide the requested network service (e.g., which may be used to execute an EPC function, component, or slice). The NM 214 may provide a package of end-user functions with the responsibility for the management of a network, which may include network elements with VNFs 208, non-virtualized network functions, or both (management of the VNFs 208 may occur via the EM 210). The OSS portion of the OSS/BSS 222 is responsible for network management, fault management, configuration management and service management. The BSS portion of the OSS/BSS 222 is responsible for customer management, product management and order management. In the NFV architecture, the current BSS/OSS 222 of an operator may be interworking with an NFV management and orchestration (NFV-MANO) 232 using standard interfaces (or reference points).

Interconnection points (or reference points) between functional blocks can expose an external view of a functional block. These can include OS-Ma-nfvo between the NM 214 and NFVO 212; Ve-VNFM-em between the EM 210 and the VNFM 206; Ve-Vnfm-vnf between a VNF 208 and VNFM 206; Or-Vnfm between the NFVO 212 and the VNFM 206; Or-Vi between the NFVO 212 and the VIM 202; Vi-Vnfm between the VNFM 206 and VIM 202; NF-Vi between the NFVI 204 and the VIM 202; VN-Nf between the NFVI 204 and VNF 208; and Itf-N between the EM 210 or DM 226 and NM 214.

A virtualized resource performance management interface has been defined for reference point Vi-Vnfm between VIM 202 and VNFM 206 as shown in FIG. 2A. The operations to create a PM job and notify the availability of PM data can be transmitted using the above-mentioned interface. The usage of an individual virtual CPU (sometimes called a virtual processor or vCPU) is a part of a virtualized resource (VR), or the consolidated usage of all virtual CPUs of a Virtualized Compute Resource and can be monitored by a performance measurement.

Figure 2B:
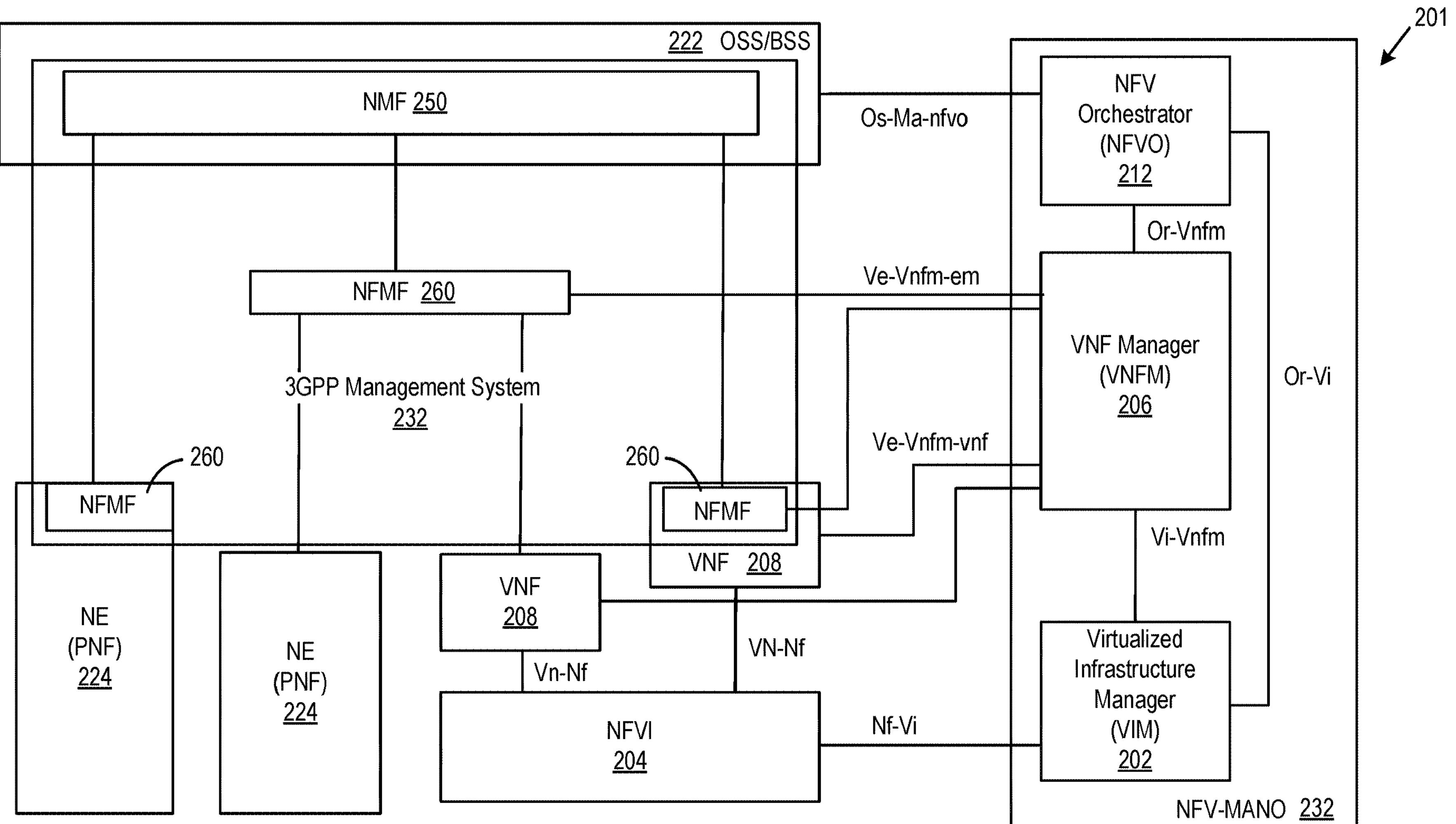
FIG. 2B is a diagram illustrating an example network management architecture for 5G networks that include virtualized network functions that can be part of 5GC and NG-RAN according to certain embodiments.

The example network architecture shown in FIG. 2A may be for 4G/LTE networks. However, certain embodiments herein may also be applicable to 5G networks. Thus, FIG. 2B is a diagram illustrating an example network management architecture 201 for 5G networks that include virtualized network functions that can be part of 5GC and NG-RAN according to certain embodiments. The illustrated network management architecture 201 is provided by way of example only and skilled persons will recognize from the disclosure herein that the described embodiments may also be used with other virtualized network architectures. The components shown in FIG. 2B, according to some example embodiments, can support NFV. The system 201 is illustrated as including a virtualized infrastructure manager (VIM) 202, a network function virtualization infrastructure (NFVI) 204, a VNF manager (VNFM) 206, virtualized network functions (VNFs) 208, an network function management function (NFMF) 260, an NFV orchestrator (NFVO) 212, and a network management function (NMF) 250 within an operation support system/business support system (OSS/BSS) 222. In certain embodiments, the NMF 250 may be located in a NM and the NFMF 260 may be located in an EM or DM, such as the NM 214, the EM 210, or the DM 226 shown in FIG. 2A.

The VIM 202 manages the resources of the NFVI 204. The NFVI 204 can include physical or virtual resources and applications (including hypervisors) used to execute the system 201. The VIM 202 may manage the life cycle of virtual resources with the NFVI 204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 206 may manage the VNFs 208. The VNFs 208 may be used to execute IMS, EPC and 5G (5GC and NG-RAN) components/functions. The VNFM 206 may manage the life cycle of the VNFs 208 and track performance, fault and security of the virtual aspects of VNFs 208. The NFMF 260 may track the performance, fault and security of the functional aspects of VNFs 208 and physical network functions (PNFs) 224. The tracking data from the VNFM 206 and the NFMF 260 may comprise, for example, performance measurement (PM) data used by the VIM 202 or the NFVI 204. Both the VNFM 206 and the NFMF 260 can scale up/down the quantity of VNFs 208 of the system 201. In some embodiments, the NFMF 260 is responsible for fault, configuration, accounting, performance and security management (FCAPS). In other embodiments, the NFMF 260 can manage multiple VNFs 208 or multiple NFMFs 260 manage a single VNF 208 each. In an embodiment, the NFMF 260 can be a VNF 208 itself. In this example embodiment, the combination of the NMF 250 and the NFMF 260 is considered to be a 3GPP management system 232. Thus, unlike the 3GPP management system 230 shown in FIG. 2A that includes management entities like the NM 214 and the EM 210, the 3GPP management system 232 of this example for 5G networks only includes logical management functions.

The NFVO 212 may coordinate, authorize, release and engage resources of the NFVI 204 in order to provide the requested network service (e.g., which may be used to execute an EPC function, component, or slice). The NMF 250 may provide a package of end-user functions with the responsibility for the management of a network, which may include network elements with VNFs 208, non-virtualized network functions, or both (management of the VNFs 208 may occur via the NFMF 260). The OSS portion of the OSS/BSS 222 is responsible for network management, fault management, configuration management and service management. The BSS portion of the OSS/BSS 222 is responsible for customer management, product management and order management. In the NFV architecture, the current BSS/OSS 222 of an operator may be interworking with an NFV management and orchestration (NFV-MANO) 232 using standard interfaces (or reference points).

Interconnection points (or reference points) between functional blocks can expose an external view of a functional block. These can include OS-Ma-nfvo between the NMF 250 and NFVO 212; Ve-VNFM-em between the NFMF 260 and the VNFM 206; Ve-Vnfm-vnf between a VNF 208 and VNFM 206; Or-Vnfm between the NFVO 212 and the VNFM 206; Or-Vi between the NFVO 212 and the VIM 202; Vi-Vnfm between the VNFM 206 and VIM 202; NF-Vi between the NFVI 204 and the VIM 202; and VN-Nf between the NFVI 204 and VNF 208.

A virtualized resource performance management interface has been defined for reference point Vi-Vnfm between VIM 202 and VNFM 206 as shown in FIG. 2B. The operations to create a PM job and notify the availability of PM data can be transmitted using the above-mentioned interface. The usage of an individual virtual CPU (sometimes called a virtual processor or vCPU) is a part of a virtualized resource (VR), or the consolidated usage of all virtual CPUs of a Virtualized Compute Resource and can be monitored by a performance measurement.

The following embodiments describe example life cycle management use cases and configuration management use cases. In these use cases, certain example compliance rules may designate qualifiers for certain steps, such as mandatory (M), optional (0), and/or conditional (C). These qualifiers are provided by way of example only and not to limit the disclosure.

Life Cycle Management Use Cases

Figure 3:
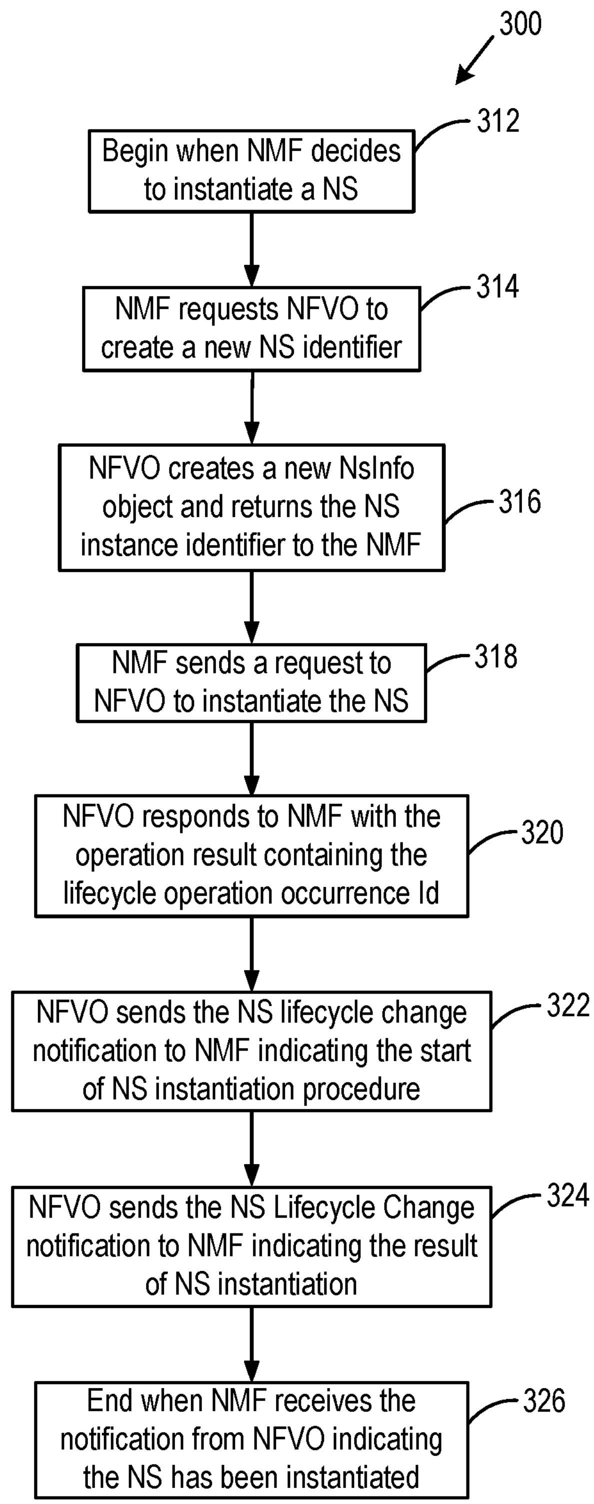
FIG. 3 is a flow chart of a method to instantiate a network service (NS) according to certain embodiments.

FIG. 3 is a flow chart of a method 300 to instantiate a NS according to certain embodiments. As discussed below with respect to TABLES 1-3, the method 300 may be used by an NMF in cooperation with an NFVO to, for example, (a) instantiate a NS containing a new VNF that is part of a gNB, (b) to instantiate a NS containing a PNF that is part of a gNB, or (c) to instantiate a NS containing a PNF and a new VNF that form a gNB.

The method 300 begins 312 when the NMF decides to instantiate a NS. Then, the NMF requests 314 the NFVO to create a new NS identifier. See, e.g., clause 7.3.2 of ETSI GS NFV-IFA013 "Network Function Virtualization (NFV); Management and Orchestration; Os-Ma-nfvo Reference Point—Interface and Information Model Specification" (hereinafter, "GS NFV-IFA013"). A create NS identifier operation used in certain embodiments creates a NS instance identifier, and an associated instance of a NsInfo information element identified by that identifier, in a NOT_INSTANTIATED state without instantiating the NS or doing any additional lifecycle operation(s). The operation may allow an immediate return of a NS instance identifier that can be used in subsequent lifecycle operations.

The NFVO creates 316 a new NsInfo object and returns the NS instance identifier to the NMF. See, clause 7.3.2.4 of GS NFV-IFA013. In case of success, a NS instance identifier and the associated instance of a NsInfo information element has been created in the NOT_INSTANTIATED state and can be used in subsequent lifecycle operations. In case of failure, appropriate error information is returned.

The NMF sends 318 a request to the NFVO to instantiate the NS, as described in more detail with respect to TABLES 1-3. In certain embodiments, the NMF may invoke the instantiate NS operation. See, e.g., clause 7.3.3 of GS NFV-IFA013. The instantiate NS operation allows for references to existing VNF instances and NS instances that are to be used in the new NS (i.e., the NS being instantiated) and additional parameterization for new VNFs and NSs. A hierarchy of nested NS and VNFs below the NS being instantiated may be acyclic (i.e., no loops). A vnfProfile information element in a network service descriptor (NSD) allows the OSS/BSS to specify the number of VNFs to be created at NS instantiation time (it is possible for this number to be zero). A NSD instance, which can be reused among different NS instantiations, is indicated using the create NS operation previous to executing the instantiate NS operation.

The NFVO responds 320 to the NMF with the operation result containing the lifecycle operation occurrence identifier (Id), the NFVO sends 322 the NS lifecycle change notification to the NMF indicating the start of the NS instantiation procedure, and the NFVO sends 324 the NS lifecycle change notification to NMF indicating the result of NS instantiation. See, e.g., clause 7.3.3.4 of GS NFV- IFA013. In case of success, the NS has been instantiated and in case of failure appropriate error information is provided in a "result" lifecycle change notification. In certain embodiments, the NFVO first returns a lifecycleOperationOccurrence Id and second sends a "start" lifecycle change notification before additional notifications or messages as part of the operation are issued or operations towards the VNFM or VIM are invoked. On the successful completion of the operation, the NFVO sends the "result" lifecycle change notification (e.g., indicating the NS has been instantiated). If the NS instance was already in the INSTANTIATED state, the operation fails. The method 300 ends 326 when the NMF receives the notification from the NFVO indicating the NS has been instantiated.

TABLE 1 shows an example life cycle management use case, which may be used with the method 300 shown in FIG. 3, for instantiation of NS containing new VNF that is part of a gNB according to one embodiment.

TABLE 1

| Use Case Stage | Evolution/Specification |
|---|---|
| Goal | Enable NMF to instantiate a NS that contains a new VNF (CU) that is part of a gNB via Os-Ma-nfvo reference point. |
| Actors/Roles | NMF |
| Telecom resources | NMF, NFVO |
| Assumptions | Part of a gNB (CU) can be deployed as VNF. PNF part of a gNB is not yet available at the time of NS instantiation. |
| Pre-conditions | The VNF Package for the VNF instantiation is on-boarded and enabled. |
| Begins when | NMF decides to instantiate a NS that contains a new VNF that is part of a gNB. |
| Step 1 (M) | NMF requests NFVO to create a new NS identifier. |
| Step 2 (M) | NFVO creates a new NsInfo object and returns the NS instance identifier to the NMF. |
| Step 3 (M) | NMF sends a request to NFVO to instantiate a NS including instantiating a new VNF instance that is part of gNB with the following parameter: additionalParamForVnf, which provides additional parameter(s) per VNF instance. |
| Step 4 (M) | NFVO responds to NMF with the operation result containing the lifecycle operation occurrence Id. |
| Step 5 (M) | NFVO sends the NS lifecycle change notification to NMF indicating the start of NS instantiation procedure. |
| Step 6 (M) | NFVO sends the NS Lifecycle Change notification to NMF indicating the result of NS instantiation. |
| Ends when | Ends when NMF receives the notification from NFVO indicating the NS has been instantiated. |
| Exceptions | One of the steps identified above fails. |
| Post-conditions | A new NS that contains a new VNF instance that is part of gNB has been instantiated. |
| Traceability | REQ-VRAN_Mgmt-Os-Ma-nfvo_CON-1, REQ-VRAN_Mgmt-Os-Ma-nfvo_CON-4 |

The method 300 of FIG. 3 and TABLE 1 enables an NMF to instantiate a NS that includes a new VNF (CU or upper layer of NR BS) that is part of a gNB via the Os-Ma-nfvo reference point (see, e.g., FIGS. 2A and 2B). In this example, it is assumed that part of the gNB (CU or upper layer of NR BS) can be deployed as the VNF, and that the PNF part of the gNB is not yet available at the time of the NS instantiation. This example also sets as a pre-condition that a VNF package for the VNF instantiation is on-boarded and enabled.

With reference to the method 300 of FIG. 3 and TABLE 1, the method 300 begins 312 when the NMF decides to instantiate a NS that contains the new VNF that is part of a gNB. The NMF requests 314 the NFVO to create a new NS identifier. The new NS identifier may be based on a NSD that references to one or more virtualized network function (VNF) descriptors of virtualized parts of a base station and/or one or more physical network function (PNF) descriptors of non-virtualized parts of the base station. The NFVO creates 316 a new NsInfo object and returns the NS instance identifier to the NMF. Then, the NMF sends 318 a request to the NFVO to instantiate a NS including instantiating a new VNF instance that is part of gNB with the following parameter: additionalParamForVnf, which provides additional parameter(s) per VNF instance. The method 300 proceeds as described above with respect to FIGS. 3 (at 320, 322, 324, and 326). Exceptions may be handled when one of the identified steps fails. The method 300 results in an instantiated new NS that contains a new VNF instance that is part of a gNB.

TABLE 2 shows an example life cycle management use case, which may be used with the method 300 shown in FIG. 3, for instantiation of NS containing PNF that is part of a gNB.

TABLE 2

| Use Case Stage | Evolution/Specification |
|---|---|
| Goal | Enable NMF to instantiate a NS that contains PNF (DU) that is part of a gNB via Os-Ma-nfvo reference point. |
| Actors and Roles | NMF |
| Telecom resources | NMF, NFVO |
| Assumptions | PNF part of a gNB has been deployed. |
| Pre-conditions | |
| Begins when | NMF decides to instantiate a NS that contains PNF that is part of a gNB. |
| Step 1 (M) | NMF requests NFVO to create a new NS identifier. |
| Step 2 (M) | NFVO creates a new NsInfo object and returns the NS instance identifier to the NMF. |
| Step 3 (M) | NMF sends a request to NFVO to instantiate a NS that contains PNF, with the following parameter: pnfInfo, which provides the information of PNF that is part of a gNB. |
| Step 4 (M) | NFVO responds to NMF with the operation result containing the lifecycle operation occurrence Id. |
| Step 5 (M) | NFVO sends the NS lifecycle change notification to NMF indicating the start of NS instantiation procedure. |
| Step 6 (M) | NFVO sends the NS Lifecycle Change notification to NMF indicating the result of NS instantiation. |
| Ends when | Ends when NMF receives the notification from NFVO indicating the NS has been instantiated. |
| Exceptions | One of the steps identified above fails. |
| Post-conditions | A new NS that contains PNF and new VNF that form a gNB has been instantiated. |
| Traceability | REQ-VRAN_Mgmt-Os-Ma-nfvo_CON-2, REQ-VRAN_Mgmt-Os-Ma-nfvo_CON-4 |

The method 300 of FIG. 3 and TABLE 2 enables an NMF to instantiate a NS that contains PNF (DU or lower layer of NR BS) that is part of a gNB via the Os-Ma-nfvo reference point (see, e.g., FIGS. 2A and 2B). In this example, it is assumed that the PNF part of the gNB has been deployed.

With reference to the method 300 of FIG. 3 and TABLE 2, the method 300 begins 312 when the NMF decides to instantiate a NS that contains a PNF that is part of a gNB. The NMF requests 314 the NFVO to create a new NS identifier, and the NFVO creates 316 a new NsInfo object and returns the NS instance identifier to the NMF. Then, the NMF sends 318 a request to the NFVO to instantiate a NS that contains PNF, with the following parameter: pnfInfo, which provides the information of PNF that is part of a gNB. The method 300 proceeds as described above with respect to FIGS. 3 (at 320, 322, 324, and 326). Exceptions may be handled when one of the identified steps fails. The method 300 results in an instantiated new NS that contains a PNF and a new VNF that form a gNB.

TABLE 3 shows an example life cycle management use case, which may be used with the method 300 shown in FIG. 3, for instantiation of NS containing PNF and new VNF that form a gNB.

TABLE 3

| Use Case Stage | Evolution/Specification |
|---|---|
| Goal | Enable NMF to instantiate a NS that contains PNF (DU) and new VNF (CU) via Os-Ma-nfvo reference point. |
| Actors and Roles | NMF |
| Telecom resources | NMF, NFVO |
| Assumptions | Part of a gNB (CU) can be deployed as VNF. PNF part of a gNB has been deployed. |
| Pre-conditions | VNF Package for VNF instantiation is on-boarded and enabled. |
| Begins when | NMF decides to instantiate a NS that contains PNF and a new VNF that form a gNB. |
| Step 1 (M) | NMF requests NFVO to create a new NS identifier. |
| Step 2 (M) | NFVO creates a new NsInfo object and returns the NS instance identifier to the NMF. |
| Step 3 (M) | NMF sends a request to NFVO to instantiate a NS that contains PNF and new VNF, with the following parameters: additionalParamForVnf, which provides additional parameter(s) per VNF instance; and pnfInfo, which provides the information of PNF that is part of a gNB. |
| Step 4 (M) | NFVO responds to NMF with the operation result containing the lifecycle operation occurrence Id. |
| Step 5 (M) | NFVO sends the NS lifecycle change notification to NMF indicating the start of NS instantiation procedure (see clause 7.3.3.4 of ETSI GS NFV-IFA 013 [2]). |
| Step 6 (M) | NFVO sends the NS Lifecycle Change notification to NMF indicating the result of NS instantiation. |
| Ends when | Ends when NMF receives the notification from NFVO indicating the NS has been instantiated. |
| Exceptions | One of the steps identified above fails. |
| Post-conditions | A new NS that contains PNF and a new VNF that form a gNB has been instantiated. |
| Traceability | REQ-VRAN_Mgmt-Os-Ma-nfvo_CON-3, REQ-VRAN_Mgmt-Os-Ma-nfvo_CON-4 |

The method 300 of FIG. 3 and TABLE 3 enables an NMF to instantiate a NS that contains PNF (DU or lower layer of NR BS) and new VNF (CU or upper layer of NR BS) via the Os-Ma-nfvo reference point (see, e.g., FIGS. 2A and 2B). In this example, it is assumed that part of a gNB (CU or upper layer of NR BS) can be deployed as VNF, and that the PNF part of the gNB has been deployed. This example also sets as a pre-condition that a VNF package for VNF instantiation is on-boarded and enabled.

With reference to the method 300 of FIG. 3 and TABLE 3, the method 300 begins 312 when the NMF decides to instantiate a NS that contains PNF and a new VNF that form a gNB. The NMF requests 314 the NFVO to create a new NS identifier, and the NFVO creates 316 a new NsInfo object and returns the NS instance identifier to the NMF. Then, the NMF sends 318 a request to the NFVO to instantiate a NS that contains PNF and new VNF, with the following parameters: additionalParamForVnf, which provides additional parameter(s) per VNF instance; and pnfInfo, which provides the information of PNF that is part of a gNB. The method 300 proceeds as described above with respect to FIGS. 3 (at 320, 322, 324, and 326). Exceptions may be handled when one of the identified steps fails. The method 300 results in an instantiated new NS that contains PNF and a new VNF that form a gNB.

Figure 4:
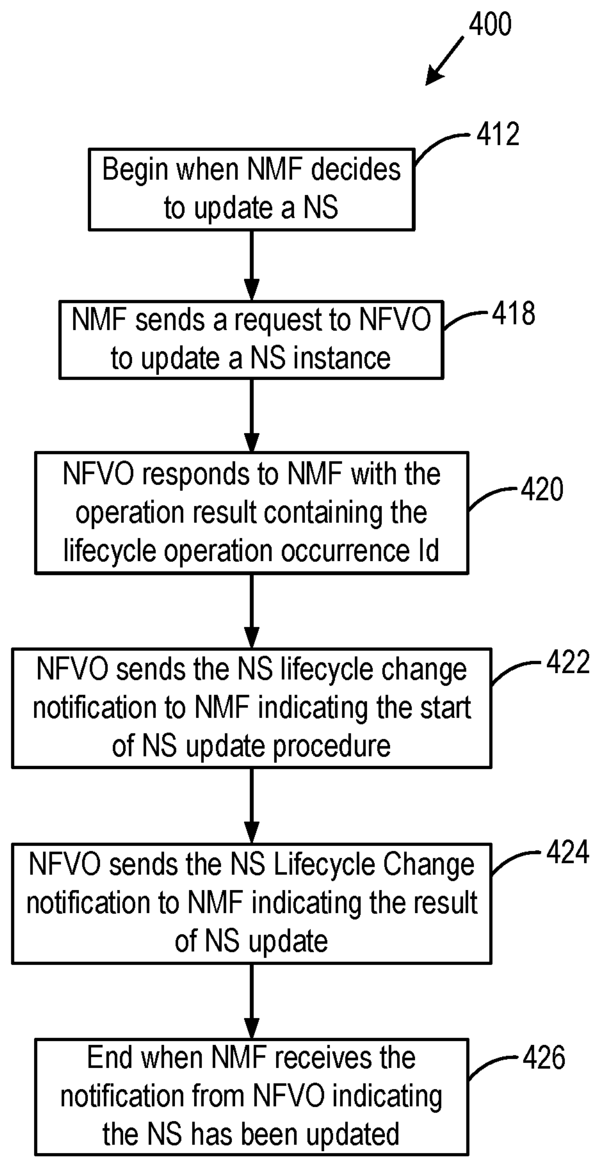
FIG. 4 is a flow chart of a method to update a NS according to certain embodiments.

FIG. 4 is a flow chart of a method 400 to update a NS according to certain embodiments. As discussed below with respect to TABLES 4-5, the method 400 may be used by an NMF in cooperation with an NFVO to, for example, (a) update a NS instance to add the VNF that is part of a gNB; and (b) update a NS instance to add the PNF that is part of a gNB.

The method 400 begins 412 when the NMF decides to update a NS. Then, the NMF sends 418 a request to the NFVO to update the NS to add the PNF instance. See, e.g., clause 7.3.5 of GS NFV-IFA013. An update NS operation updates an NS instance and may also be used to embed VNF life cycle management (LCM) operations in support of a fine grained NS LCM approach.

The NFVO responds 420 to the NMF with the operation result containing the lifecycle operation occurrence Id, the NFVO sends 422 the NS lifecycle change notification to the NMF indicating the start of the NS update procedure, and the NFVO sends 424 the NS lifecycle change notification to NMF indicating the result of NS update. See, e.g., clause 7.3.5.4 of GS NFV-IFA013. In case of success, the NS has been updated according to the request. In case of failure, appropriate error information is provided in the "result" lifecycle change notification. In certain embodiments, the NFVO first returns a lifecycleOperationOccurrenceId and second sends a "start" lifecycle change. Notification may be before additional notifications or messages as part of this operation are issued, or operations towards the VNFM or VIM are invoked. In certain embodiments, on successful as well as unsuccessful completion of the operation, the NFVO send the "result" lifecycle change notification (e.g., indicating the NS instance has been updated). The method 400 ends 426 when the NMF receives the notification from the NFVO indicating that the NS has been updated.

TABLE 4 shows an example life cycle management use case, which may be used with the method 400 shown in FIG. 4, for updating a NS instance to add the VNF that is part of a gNB according to one embodiment.

TABLE 4

| Use Case Stage | Evolution/Specification |
|---|---|
| Goal | Enable NMF to update a NS to add the VNF (CU) via Os-Ma-nfvo reference point. |
| Actors and Roles | NMF |
| Telecom resources | NMF, NFVO |
| Assumptions | Part of a gNB (CU) can be deployed as VNF. |
| Pre-conditions | The NS has been instantiated, and has contained a PNF. |
| Begins when | NMF decides to use NS update to add the VNF instance to a NS that already contains a PNF in order to form a gNB. |
| Step 1 (M) | NMF sends a request to NFVO to update a NS instance to add the VNF instance, with the following parameters: nsInstanceId, which provides the identifier of the NS instance where the VNF instance is to be added; and addVnfInstance, which provides the existing VNF instance to be added to the NS instance. |
| Step 4 (M) | NFVO responds to NMF with the operation result containing the lifecycle operation occurrence Id (see clause 7.3.5.4 [2]). |
| Step 5 (M) | NFVO sends the NS lifecycle change notification to NMF indicating the start of NS update procedure (see clause 7.3.5.4 of ETSI GS NFV-IFA 013 [2]). |
| Step 6 (M) | NFVO sends the NS Lifecycle Change notification to NMF indicating the result of NS update (see clause 7.3.5.4 of ETSI GS NFV-IFA 013 [2]). |
| Ends when | Ends when NMF receives the notification from NFVO indicating the NS instance has been updated. |
| Exceptions | One of the steps identified above fails. |
| Post-conditions | The NS instance has been updated with addition of the VNF instance that is part of gNB. |
| Traceability | REQ-VRAN_Mgmt-Os-Ma-nfvo_CON-5 |

The method 400 of FIG. 4 and TABLE 4 enables an NMF to update a NS to add the VNF (CU or upper layer of NR BS) via Os-Ma-nfvo reference point (see, e.g., FIGS. 2A and 2B). In this example, it is assumed that part of a gNB (CU or upper layer of NR BS) can be deployed as VNF. This example also sets as a pre-condition that the NS has been instantiated and has contained a PNF.

With reference to the method 400 of FIG. 4 and TABLE 4, the method 400 begins 412 when the NMF decides to update the NS by invoking an NS update procedure to add the VNF instance to a NS that already contains a PNF in order to form a gNB. The NMF sends 418 a request to NFVO to update a NS instance to add the VNF instance, with the following parameters: nsInstanceId, which provides the identifier of the NS instance where the VNF instance is to be added; and addVnfInstance, which provides the existing VNF instance to be added to the NS instance. The method 400 then proceeds as described above with respect to FIGS. 4 (at 420, 422, 424, and 426). Exceptions may be handled when one of the identified steps fails. The method 400 results in the NS instance that has been updated with addition of the VNF instance that is part of gNB.

TABLE 5 shows an example life cycle management use case, which may be used with the method 400 shown in FIG. 4, for updating a NS instance to add the PNF that is part of a gNB according to one embodiment.

TABLE 5

| Use Case Stage | Evolution/Specification |
|---|---|
| Goal | Enable NMF to update a NS to add the PNF of a gNB (DU) via Os-Ma-nfvo reference point. |
| Actors and Roles | NMF |
| Telecom resources | NMF, NFVO |
| Assumptions | Part of a gNB (CU) can be deployed as VNF that has already been contained in an existing NS instance. |
| Pre-conditions | The NS has been instantiated, and has contained a VNF. |
| Begins when | NMF decides to update a NS instance to add the PNF instance to a NS that already contains a VNF instance in order to form a gNB. |
| Step 1 (M) | NMF sends a request to NFVO to update a NS instance to add the PNF instance, with the following parameters: nsInstanceId, which provides the identifier of the NS instance where the PNF instance is to be added; and pnfInfo, which provides the information of PNF to be contained in the NS. |
| Step 4 (M) | NFVO responds to NMF with the operation result containing the lifecycle operation occurrence Id. |
| Step 5 (M) | NFVO sends the NS lifecycle change notification to NMF indicating the start of NS update procedure. |
| Step 6 (M) | NFVO sends the NS Lifecycle Change notification to NMF indicating the result of NS update. |
| Ends when | Ends when NMF receives the notification from NFVO indicating the NS instance has been updated. |
| Exceptions | One of the steps identified above fails. |
| Post-conditions | The NS instance has been updated with addition of PNF that is part of gNB. |
| Traceability | REQ-VRAN_Mgmt-Os-Ma-nfvo_CON-6 |

The method 400 of FIG. 4 and TABLE 5 enables an NMF to update a NS to add the PNF of a gNB (DU or lower layer of NR BS) via Os-Ma-nfvo reference point (see, e.g., FIGS. 2A and 2B). In this example, it is assumed that part of a gNB (CU or upper layer of BS) can be deployed as VNF that has already been contained in an existing NS instance. This example also sets as a pre-condition that the NS has been instantiated and has contained a VNF.

With reference to the method 400 of FIG. 4 and TABLE 5, the method 400 begins 412 when the NMF decides to update a NS instance to add PNF instance to a NS that already contains a VNF instance in order to form a gNB. The NMF sends 418 a request to NFVO to update a NS instance to add the PNF instance, with the following parameters: nsInstanceId, which provides the identifier of the NS instance where the PNF instance is to be added; and pnfInfo, which provides the information of PNF to be contained in the NS. It should be noted that the pnfInfo parameter is not defined in clause 7.3.5.2 of GS NFV-IFA013. The method 400 then proceeds as described above with respect to FIGS. 4 (at 420, 422, 424, and 426). Exceptions may be handled when one of the identified steps fails. The method 400 results in the NS instance that has been updated with addition of PNF that is part of gNB.

Configuration Management Use Cases

Figure 5:
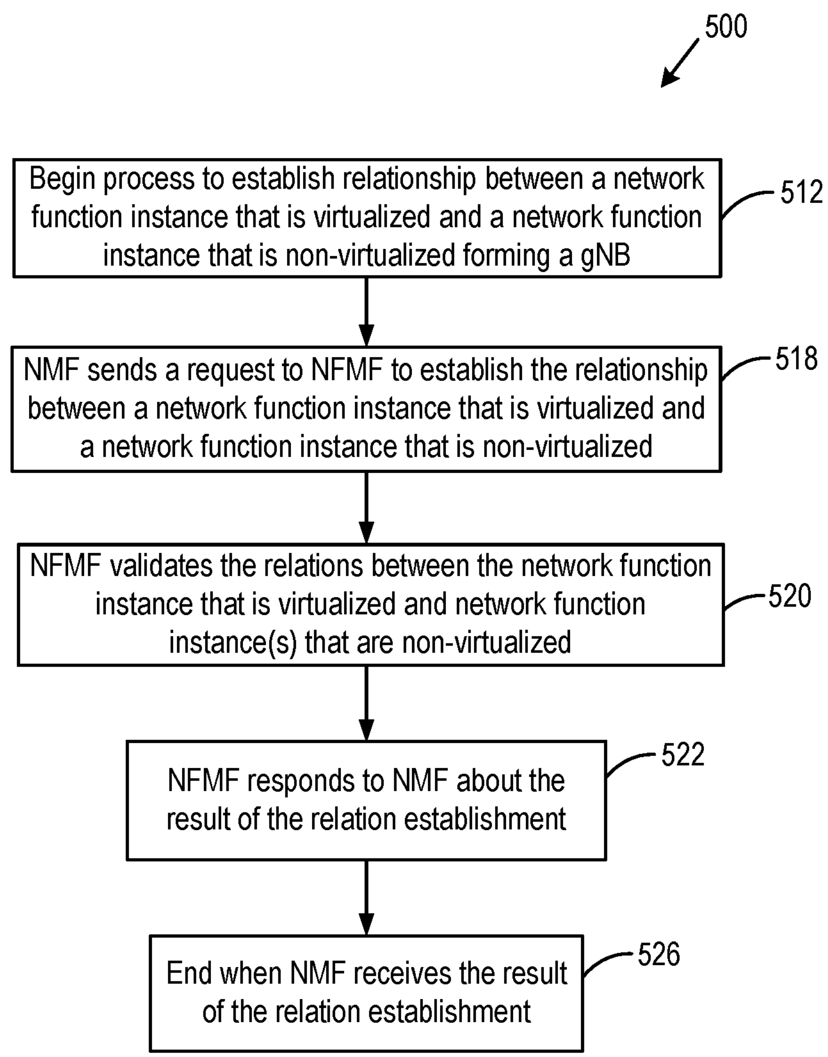
FIG. 5 is a flow chart of a method to establish a relation between a network function instance that is virtualized and a network function instance that is non-virtualized forming a gNB according to certain embodiments.

FIG. 5 is a flow chart of a method 500 to establish a relation between a network function instance that is virtualized and network function instance that is non-virtualized forming a gNB according to certain embodiments. As discussed below with respect to TABLE 6, the method 500 may be used by an NMF in cooperation with an NFMF, a VNF, and a PNF to, for example, enable the NMF to establish a relation between a network function instance that is virtualized and a network function instance or instance(s) that are non-virtualized forming a gNB.

The method 500 begins 512 the process to establish the relationship between the network function instance that is virtualized and network function instance that is non-virtualized forming the gNB, and the NMF sends 518 a request to the NFMF to establish the relationship between the network function instance that is virtualized and the network function instance that is non-virtualized. Then, the NFMF validates 520 the relations between the network function instance that is virtualized and network function instance(s) that are non-virtualized, and responds 522 to the NMF about the result of the relation establishment. The method 500 ends 526 when the NMF receives the result of the relationship establishment.

TABLE 6 shows an example configuration management use case, which may be used with the method 500 shown in FIG. 5, for establishment of a relation between the network function instance that is virtualized and the network function instance or instances that are non-virtualized according to one embodiment.

TABLE 6

| Use Case Stage | Evolution/Specification |
|---|---|
| Goal | Enable NMF to establish the relation between network function instance that is virtualized and network function instance that is non-virtualized forming a gNB. |
| Actors and Roles | NMF |
| Telecom resources | NMF, NFMF, VNF, PNF |
| Assumptions | |
| Pre-conditions | VNF instance of a gNB has been instantiated; PNF instance of a gNB has been deployed; MOIs of the network function instances realized by the VNF instance and network function instances realized by the PNF instance forming a gNB have been created; and NMF knows which network function instance that is virtualized and network function instance that is non-virtualized compose a gNB. |
| Begins when | NMF decides to establish the relation between a network function instance that is virtualized and a |

TABLE 6-continued

| Use Case Stage | Evolution/Specification |
| --- | --- |
| | network function instance that is non-virtualized that compose a gNB. |
| Step 1 (M) | NMF sends a request to NFMF to establish the relation between a network function instance that is virtualized and a network function instance that is non-virtualized. Note: one network function instance that is virtualized may have relation(s) with one or more network function instances that are non-virtualized. In some embodiments, one network function instance that is non-virtualized may have relations to multiple network function instances that are virtualized. |
| Step 2 (M) | NFMF validates the relations between the network function instance that is virtualized and network function instance(s) that are non-virtualized, if they are valid, NFMF configures the network function instance that is virtualized and network function instance(s) that are non-virtualized to establish the relations. |
| Step 3 (M) | NFMF responds to NMF about the result of the relation establishment. |
| Ends when | Ends when NMF receives the result of the relation establishment. |
| Exceptions | One of the steps identified above fails. |
| Post-conditions | The relations between the network function instance that is virtualized and network function instance(s) that are non-virtualized have been established. |
| Traceability | REQ-VRAN-Mgmt-CON-7, REQ-VRAN-Mgmt-CON-8 |

The method 500 of FIG. 5 and TABLE 6 enables the NMF to establish the relation between the network function instance that is virtualized and the network function instance that is non-virtualized to form the gNB. This example sets as a pre-condition that: the VNF instance of the virtualized part of gNB has been instantiated; the PNF instance of the non-virtualized part of gNB has been deployed; the MOIs of the network function instance that is virtualized and the network function instance that is non-virtualized forming the gNB have been created; and the NMF knows which network function instance that is virtualized and network function instance that is non-virtualized can form the gNB.

With reference to the method 500 of FIG. 5 and TABLE 6, the method 500 begins 512 when the NMF decides to establish the relation between the network function instance that is virtualized and the network function instance that is non-virtualized forming the gNB, and the NMF sends 518 a request to the NFMF to establish the relation between the network function instance that is virtualized and the network function instance that is non-virtualized. The NFMF validates 520 the relations between the network function instance that is virtualized and network function instance(s) that are non-virtualized. If the relations are valid, the NFMF configures the network function instance that is virtualized and the network function instance(s) that are non-virtualized to establish the relations. The NFMF responds 522 to the NMF about the result of the relation establishment, and the method 500 ends 526 when the NMF receives the result of the relation establishment. Exceptions may be handled when one of the identified steps fails. The method 500 results in relations between the network function instance that is virtualized and the network function instance(s) that are non-virtualized being established.

The "Traceability" rows of TABLES 1-6 indicate potential requirements on management of virtualized network functions that are part of the NR, according to certain embodiments for the Os-Ma-nfvo reference point (see FIGS. 2A and 2B).

"REQ-VRAN_Mgmt-Os-Ma-nfvo_CON-1" indicates that the Os-Ma-nfvo reference point should support the capability allowing NMF to instantiate a NS including instantiating a new VNF instance that is part of gNB.

"REQ-VRAN_Mgmt-Os-Ma-nfvo_CON-2" indicates that the Os-Ma-nfvo reference point should support the capability allowing NMF to instantiate a NS containing the PNF instance that is part of gNB.

"REQ-VRAN_Mgmt-Os-Ma-nfvo_CON-3" indicates that the Os-Ma-nfvo reference point should support the capability allowing NMF to instantiate a NS containing the PNF and the new VNF that form a gNB.

"REQ-VRAN_Mgmt-Os-Ma-nfvo_CON-4" indicates that the Os-Ma-nfvo reference point should support the capability allowing NFVO to notify NMF about changes of an NS instance that are related to NS lifecycle management operations (e.g., the addition/deletion/modification of VNFs and/or PNFs).

"REQ-VRAN_Mgmt-Os-Ma-nfvo_CON-5" indicates that the Os-Ma-nfvo reference point should support the capability allowing NMF to udpate a NS to add the VNF that is part of gNB.

"REQ-VRAN_Mgmt-Os-Ma-nfvo_CON-6" indicates that the Os-Ma-nfvo reference point should support the capability allowing NMF to udpate a NS to add the PNF that is part of gNB.

"REQ-VRAN-Mgmt-CON-7" indicates that the NFMF should support the capability allowing NMF to know which VNF instance and PNF instance form a gNB.

"REQ-VRAN-Mgmt-CON-8" indicates that the NFMF should support the capability allowing NMF to establish the relation between the network function instance that is virtualized and the network function instance(s) that are non-virtualized forming a gNB.

Figure 6:
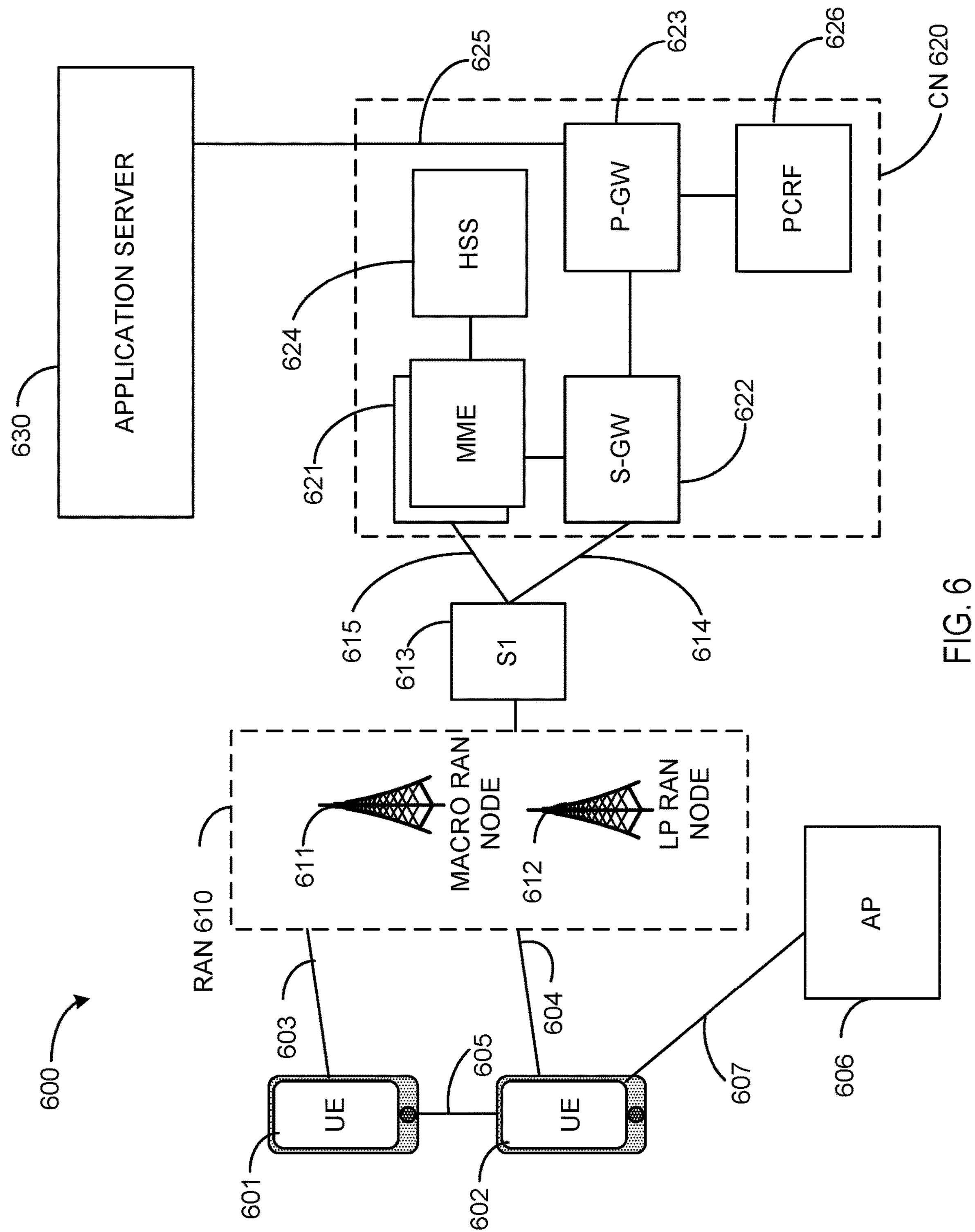
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 may be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and a serving gateway (S-GW) 622, and an S1-mobility management entity (MME) interface 615, which is a signaling interface between the RAN nodes 611 and 612 and MMEs 621.

In this embodiment, the CN 620 comprises the MMEs 621, the S-GW 622, a Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the CN 620 (e.g., an EPC network) and external networks such as a network including the application server 630 (alternatively referred to as application function (AF)) via an Internet Protocol (IP) interface 625. Generally, an application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. A Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
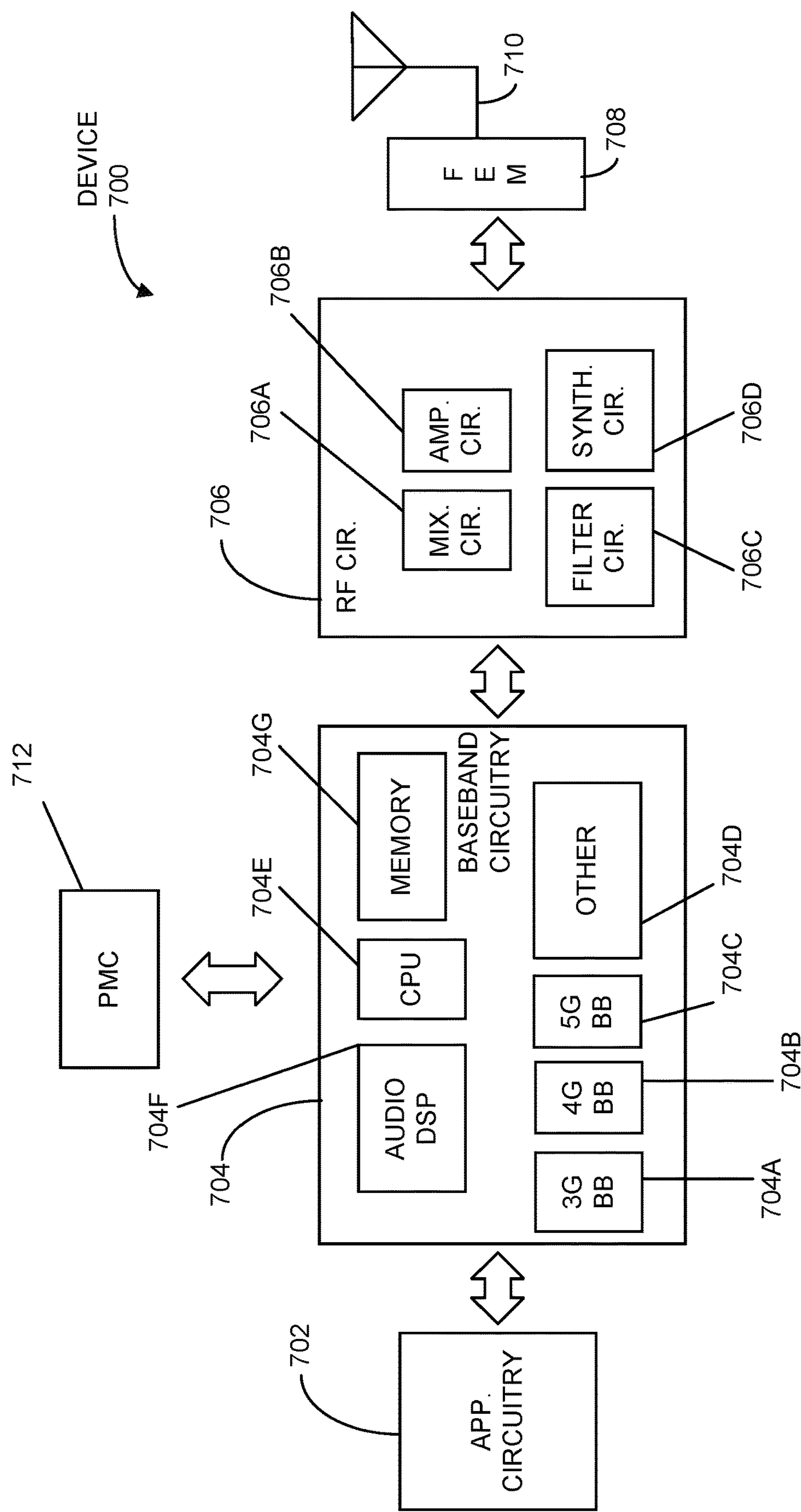
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. The RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by the filter circuitry 706C.

In some embodiments, the mixer circuitry 706A of the receive signal path and the mixer circuitry 706A of the transmit signal path may include two or more mixers and may be arranged for quadrature downconversion and upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. The FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by the RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device 700 is included in a UE. The PMC 712 may increase the power conversion efficiency while providing desirable implementation size and heat dissipation characteristics.

FIG. 7 shows the PMC 712 coupled only with the baseband circuitry 704. However, in other embodiments, the PMC 712 may be additionally or alternatively coupled with, and perform similar power management operations for, other components such as, but not limited to, the application circuitry 702, the RF circuitry 706, or the FEM circuitry 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
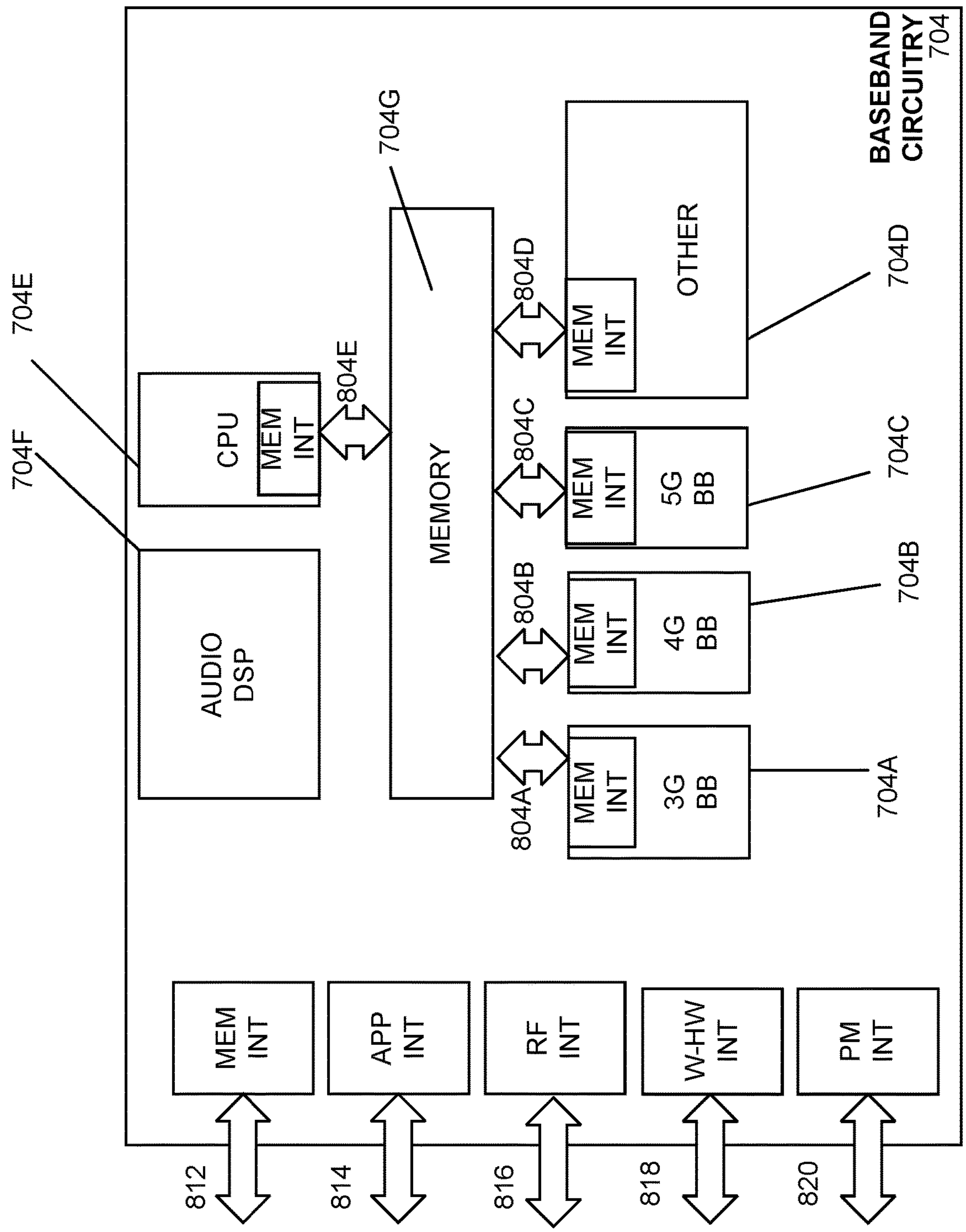
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
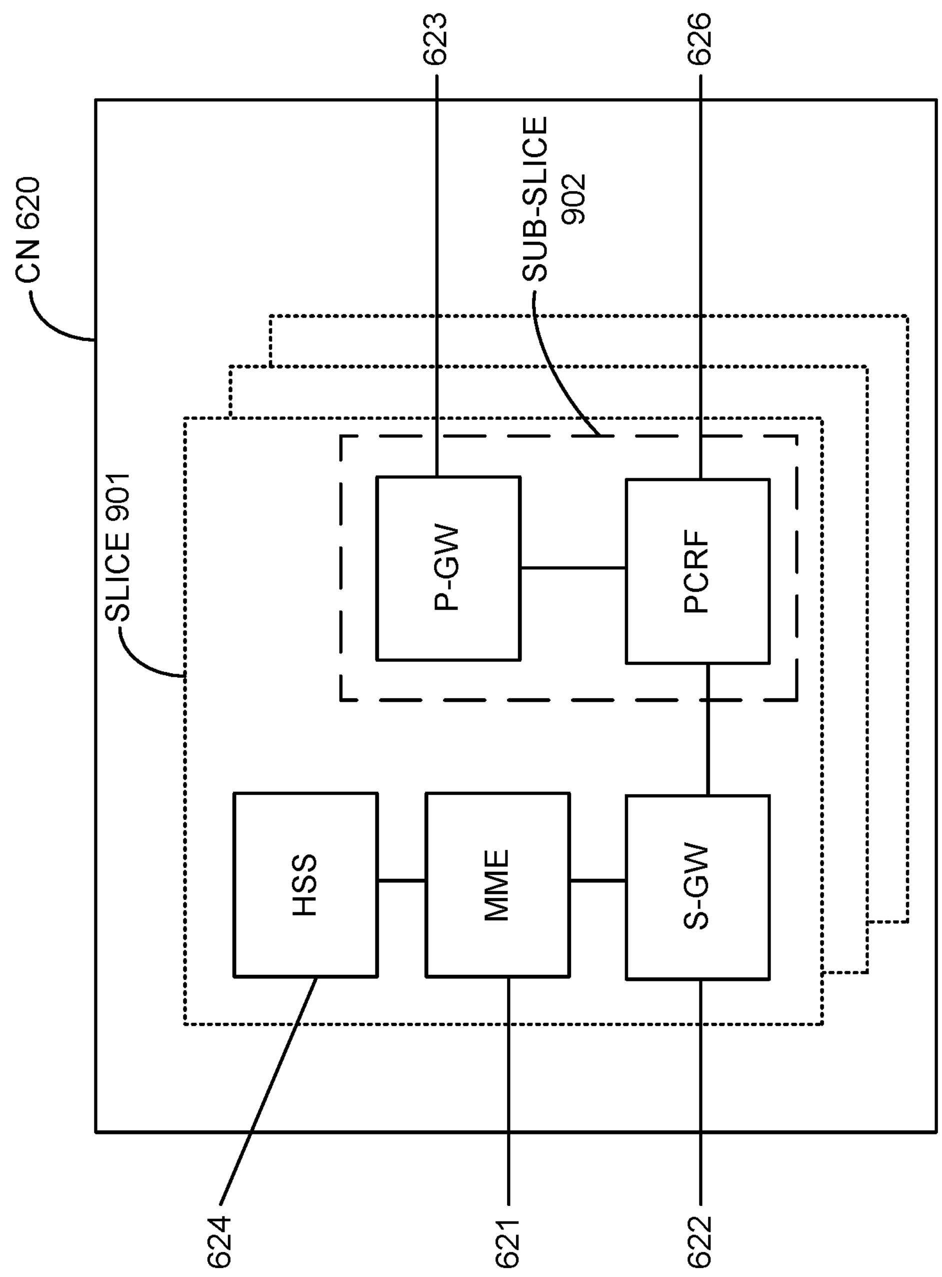
FIG. 9 illustrates components of a core network in accordance with some embodiments.

FIG. 9 illustrates components of a core network in accordance with some embodiments. The components of the CN 620 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 620 may be referred to as a network slice 901. A logical instantiation of a portion of the CN 620 may be referred to as a network sub-slice 902 (e.g., the network sub-slice 902 is shown to include the PGW 623 and the PCRF 626).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
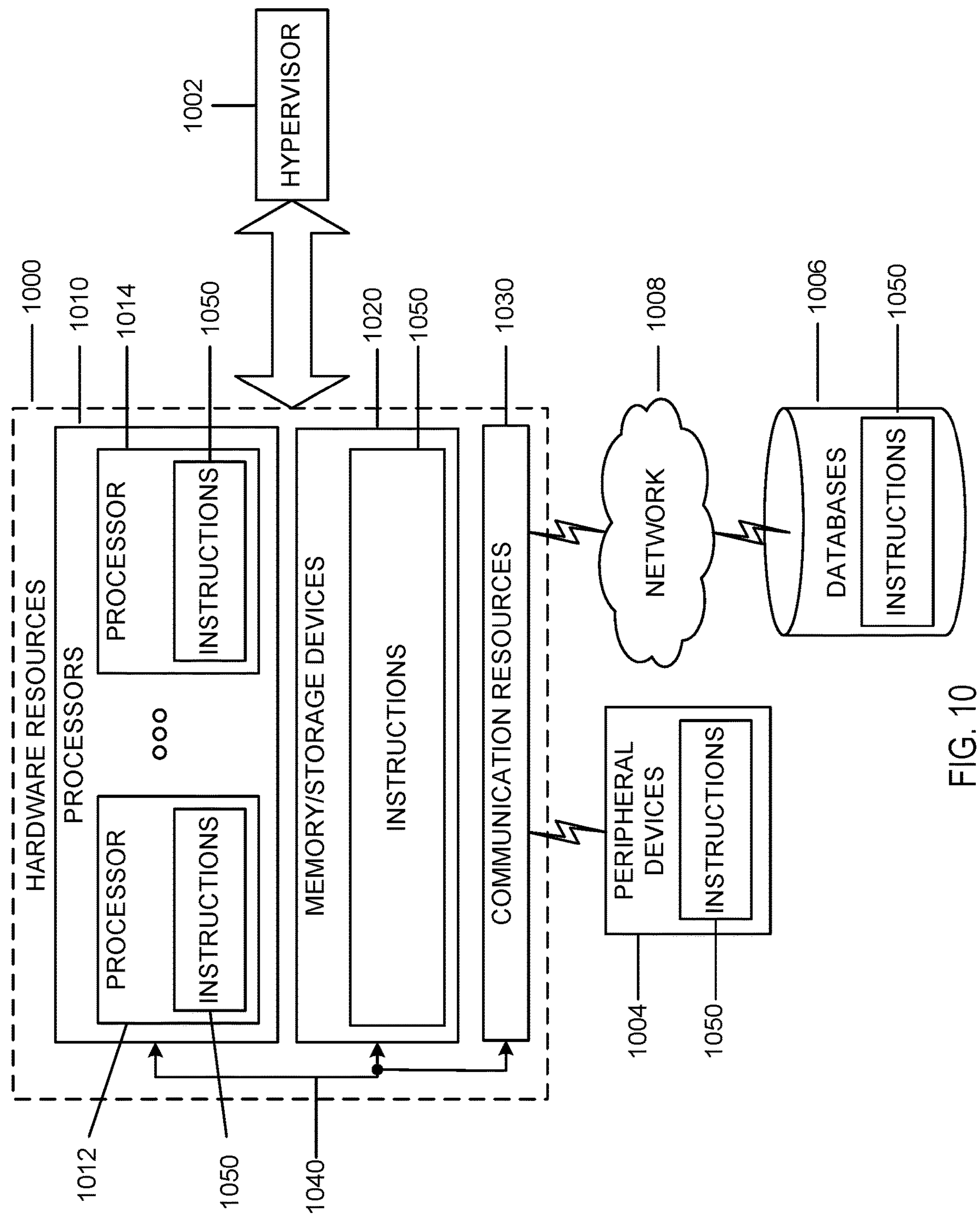
FIG. 10 is a block diagram illustrating components, according to some example embodiments, able to read instructions from a machine-readable or computer-readable and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called “network computer” or “thin client,” tablet, smart phone, personal digital assistant or other hand-held computing device, “smart” consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission “wires” known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The following examples pertain to further embodiments.

Example 1 is an apparatus for a network management function (NMF) of a mobile network that includes virtualized network functions. The apparatus includes an interface and a processor. The interface to send or receive, to or from a memory, a network service (NS) identifier. The processor to: generate a first request for a network function virtualization orchestrator (NFVO) to create a new NS identifier based on a network service descriptor (NSD) that references to one or more virtualized network function (VNF) descriptors of virtualized parts of a base station and/or one or more physical network function (PNF) descriptors of non-virtualized parts of the base station; in response to receipt of the new NS identifier from the NFVO, generate a second request for the NFVO to instantiate a NS instance that includes instantiation of the virtualized parts of the base station and/or the non-virtualized parts of the base station; and process a notification from the NFVO that indicates the NS instance has been instantiated.

Example 2 is the apparatus of Example 1, wherein the second request to instantiate the NS instance corresponds to instantiation of the NS comprising a new VNF to implement a centralized unit (CU) that is part of an upper layer of the base station.

Example 3 is the apparatus of Example 1, wherein the second request to instantiate the NS instance corresponds to instantiation of the NS comprising one or more PNFs to implement distributed units (DUs) that are part of a lower layer of the base station.

Example 4 is the apparatus of Example 1, wherein the second request to instantiate the NS instance corresponds to instantiation of the NS comprising one or more PNF and a new VNF to form the base station.

Example 5 is the apparatus of any of Examples 1-4, wherein the base station comprises a next generation radio access network (NG-RAN) node or g Node B (gNB).

Example 6 is the apparatus of any of Examples 1-5, wherein the processor is further to: process an operation result, from the NFVO, to determine a lifecycle operation occurrence identifier corresponding to the NS instance; process a first NS lifecycle change notification, from the NFVO, to determine a start of instantiation of the NS instance; and process a second NS lifecycle change notification, from the NFVO, to determine a result of the instantiation of the NS instance.

Example 7 is the apparatus of any of Examples 1-6, wherein the NMF comprises network management functionality within an operation support system (OSS).

Example 8 is the apparatus of any of Examples 1-7, wherein the processor enables the NMF to instantiate the NS instance via an Os-Ma-nfvo reference point.

Example 9 is the apparatus of any of Examples 2 or 4, wherein the second request comprises an additionalParamForVnf parameter to use for the instantiation of the NS instance comprising the new VNF.

Example 10 is the apparatus of any of Examples 3 or 4, wherein the second request comprises a pnfInfo parameter to use for the instantiation of the NS instance comprising the PNF.

Example 11 is a machine readable storage medium including machine-readable instructions, when executed by one or more processors for a network management function (NMF) of a mobile network that includes virtualized network functions, to: generate a request for a network function virtualization orchestrator (NFVO) to update a network service (NS) instance to add a virtualized network function (VNF) instance that realizes a virtualized part of a base station or a physical network function (PNF) instance that realizes a non-virtualized part of the base station; process an operation result, from the NFVO, to determine a lifecycle operation occurrence identifier corresponding to the NS instance; process a first NS lifecycle change notification, from the NFVO, to determine a start of an NS instance update operation corresponding to the lifecycle operation occurrence identifier; and process a second NS lifecycle change notification, from the NFVO, to determine a result of the NS instance update operation.

Example 12 is the machine readable storage medium of Example 11, wherein the request is to update the NS instance to instantiate the VNF that realizes a centralized unit (CU) that is part of an upper layer of a next generation radio access network (NG-RAN) node or g Node B (gNB).

Example 13 is the machine readable storage medium of Example 12, wherein the request comprises a nsInstanceId parameter that identifies the NS instance where the VNF instance is to be instantiated, and an addVnfInstance parameter that provides an existing VNF instance to be added to the NS instance.

Example 14 is the machine readable storage medium of Example 11, wherein the request is to update the NS instance to add the PNF instance that realizes a distributed unit (DU) that is part of a lower layer of a next generation radio access network (NG-RAN) node or g Node B (gNB).

Example 15 is the machine readable storage medium of Example 14, wherein the request comprises a nsInstanceId parameter that identifies the NS instance where the PNF instance is to be added, and a pnfInfo parameter that provides information of the PNF instance to be added to the NS instance.

Example 16 is the machine readable storage medium of any of Examples 11-15, wherein the processor is further to process a notification from the NFVO to determine that the NS instance has been updated.

Example 17 is the machine readable storage medium of any of Examples 11-16, wherein the NMF comprises network management functionality within an operation support system (OSS).

Example 18 is the machine readable storage medium of any of Examples 11-17, wherein the processor enables the NMF to update the NS instance via an Os-Ma-nfvo reference point.

Example 19 is a method for a network function management function (NFMF), the method comprising: receiving a request from a network management function (NMF) to establish a relation between one or more network function instances that are virtualized and one or more network function instances that are non-virtualized; performing a validation to determine whether the relations between the one or more network function instances that are virtualized and the one or more network function instances that are non-virtualized are valid; and responding to the NMF to indicate whether or not the relation between the one or more network function instances that are virtualized and the one or more network function instances that are non-virtualized has been established.

Example 20 is the method of Example 19, wherein pre-conditions of receiving the request or performing the validation comprise one or more virtualized network function (VNF) instances realizing network functions that are virtualized have been instantiated, and a managed object instance (MOI) representing the one or more network function instances has been created.

Example 21 is the method of Example 19, wherein pre-conditions of receiving the request or performing the validation comprise the one or more PNF instances realizing network functions that are non-virtualized have been deployed, and a managed object instance (MOI) representing the one or more network function instances has been created.

Example 22 is the method of Example 19, wherein the relation between the one or more network function instances that are virtualized and the one or more network function instances that are non-virtualized indicates that the one or more network functions that are virtualized and the one or more network functions that are non-virtualized are used to form a next generation radio access network (NG-RAN) node or g Node B (gNB).

Example 23 is the method of Example 19, wherein a single network function instance that is virtualized may have relations with the one or more network function instances that are non-virtualized.

Example 24 is the method of Example 19, wherein a single network function instance that is not virtualized may have relations with the one or more network function instances that are virtualized.

Example 25 is the method of Example 19, wherein performing the validation to determine that the relation between the one or more network function instances that are virtualized and the one or more network function instances that are non-virtualized is valid indicates that the NMF has a prior awareness of which network function instances that are virtualized and which network function instances that are non-virtualized can be used to form a next generation radio access network (NG-RAN) node or g Node B (gNB).

Example 26 is the method of Example 19, wherein if the relation between the one or more network function instances that are virtualized and the one or more network function instances that are non-virtualized is valid, the method for the NFMF further comprises: configuring the one or more network function instances that are virtualized and the one or more network function instances that are non-virtualized to establish the relation; and sending a response to the NMF indicating the relation has been established.

Example 27 is the method of Example 19, wherein if the relation between the one or more network function instances that are virtualized and the one or more network function instances that are non-virtualized is invalid, the method for the NFMF further comprises sending a response to the NMF indicating the relation cannot be established.

Example 28 is a method for a network management function (NMF) of a mobile network that includes virtualized network functions, the method comprising: generating a first request for a network function virtualization orchestrator (NFVO) to create a new network service (NS) identifier based on a network service descriptor (NSD) that references to one or more virtualized network function (VNF) descriptors of virtualized parts of a base station and/or one or more physical network function (PNF) descriptors of non-virtualized parts of the base station; in response to receipt of the new NS identifier from the NFVO, generating a second request for the NFVO to instantiate a NS instance that includes instantiation of the virtualized parts of the base station and/or the non-virtualized parts of the base station; and processing a notification from the NFVO that indicates the NS instance has been instantiated.

Example 29 is the method of Example 28, wherein the second request to instantiate the NS instance corresponds to instantiation of the NS comprising a new VNF to implement a centralized unit (CU) that is part of an upper layer of the base station.

Example 30 is the method of Example 28, wherein the second request to instantiate the NS instance corresponds to instantiation of the NS comprising one or more PNFs to implement distributed units (DUs) that are part of a lower layer of the base station.

Example 31 is the method of Example 28, wherein the second request to instantiate the NS instance corresponds to instantiation of the NS comprising one or more PNF and a new VNF to form the base station.

Example 32 is the method of Example 28, wherein the base station comprises a next generation radio access network (NG-RAN) node or g Node B (gNB).

Example 33 is the method of Example 28, further comprising: processing an operation result, from the NFVO, to determine a lifecycle operation occurrence identifier corresponding to the NS instance; processing a first NS lifecycle change notification, from the NFVO, to determine a start of instantiation of the NS instance; and processing a second NS lifecycle change notification, from the NFVO, to determine a result of the instantiation of the NS instance.

Example 34 is the method of Example 28, wherein the NMF comprises network management functionality within an operation support system (OSS).

Example 35 is the method of Example 28, wherein the processor enables the NMF to instantiate the NS instance via an Os-Ma-nfvo reference point.

Example 36 is the method of Example 29, wherein the second request comprises an additionalParamForVnf parameter to use for the instantiation of the NS instance comprising the new VNF.

Example 37 is the method of Example 30, wherein the second request comprises a pnfInfo parameter to use for the instantiation of the NS instance comprising the PNF.

Example 38 is an apparatus comprising means to perform a method as exemplified in any of Examples 19-37.

Example 39 is machine-readable storage including machine-readable instructions, when executed, to implement a method or realize an apparatus as exemplified in any of Examples 19-37.

Example 40 is a machine readable medium including code, when executed, to cause a machine to perform the method of any one of Examples 19-37.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for a network management function (NMF) of a mobile network that includes virtualized network functions, the apparatus comprising:

an interface to send or receive, to or from a memory, a network service (NS) identifier; and a processor to:

generate a first request for a network function virtualization orchestrator (NFVO) to create a new NS identifier based on a network service descriptor (NSD) that references to one or more virtualized network function (VNF) descriptors of virtualized parts of a base station and/or one or more physical network function (PNF) descriptors of non-virtualized parts of the base station;

in response to receipt of the new NS identifier from the NFVO, generate a second request for the NFVO to instantiate a NS instance that includes instantiation of the virtualized parts of the base station and/or the non-virtualized parts of the base station; and process a notification from the NFVO that indicates the NS instance has been instantiated.

2. The apparatus of claim 1, wherein the second request to instantiate the NS instance corresponds to instantiation of the NS comprising a new VNF to implement a centralized unit (CU) that is part of an upper layer of the base station.

3. The apparatus of claim 1, wherein the second request to instantiate the NS instance corresponds to instantiation of the NS comprising one or more PNFs to implement distributed units (DUs) that are part of a lower layer of the base station.

4. The apparatus of claim 1, wherein the second request to instantiate the NS instance corresponds to instantiation of the NS comprising one or more PNF and a new VNF to form the base station.

5. The apparatus of claim 1, wherein the base station comprises a next generation radio access network (NG-RAN) node or g Node B (gNB).

6. The apparatus of claim 1, wherein the processor is further to:

process an operation result, from the NFVO, to determine a lifecycle operation occurrence identifier corresponding to the NS instance;

process a first NS lifecycle change notification, from the NFVO, to determine a start of instantiation of the NS instance; and process a second NS lifecycle change notification, from the NFVO, to determine a result of the instantiation of the NS instance.

7. The apparatus of claim 1, wherein the NMF comprises network management functionality within an operation support system (OSS).

8. The apparatus of claim 1, wherein the processor enables the NMF to instantiate the NS instance via an Os-Ma-nfvo reference point.

9. The apparatus of claim 2, wherein the second request comprises an additionalParamForVnf parameter to use for the instantiation of the NS instance comprising the new VNF.

10. The apparatus of claim 3, wherein the second request comprises a pnfInfo parameter to use for the instantiation of the NS instance comprising the PNF.

11. A machine readable storage medium including machine-readable instructions, when executed by one or more processors for a network management function (NMF) of a mobile network that includes virtualized network functions, to:

generate a request for a network function virtualization orchestrator (NFVO) to update a network service (NS) instance to add a virtualized network function (VNF) instance that realizes a virtualized part of a base station or a physical network function (PNF) instance that realizes a non-virtualized part of the base station;

process an operation result, from the NFVO, to determine a lifecycle operation occurrence identifier corresponding to the NS instance;

process a first NS lifecycle change notification, from the NFVO, to determine a start of an NS instance update operation corresponding to the lifecycle operation occurrence identifier; and process a second NS lifecycle change notification, from the NFVO, to determine a result of the NS instance update operation.

12. The machine readable storage medium of claim 11, wherein the request is to update the NS instance to instantiate the VNF that realizes a centralized unit (CU) that is part of an upper layer of a next generation radio access network (NG-RAN) node or g Node B (gNB).

13. The machine readable storage medium of claim 12, wherein the request comprises a nsInstanceId parameter that identifies the NS instance where the VNF instance is to be instantiated, and an addVnfInstance parameter that provides an existing VNF instance to be added to the NS instance.

14. The machine readable storage medium of claim 11, wherein the request is to update the NS instance to add the PNF instance that realizes a distributed unit (DU) that is part of a lower layer of a next generation radio access network (NG-RAN) node or g Node B (gNB).

15. The machine readable storage medium of claim 14, wherein the request comprises a nsInstanceId parameter that identifies the NS instance where the PNF instance is to be added, and a pnfInfo parameter that provides information of the PNF instance to be added to the NS instance.

16. The machine readable storage medium of claim 11, wherein the processor is further to process a notification from the NFVO to determine that the NS instance has been updated.

17. The machine readable storage medium of claim 11, wherein the NMF comprises network management functionality within an operation support system (OSS).

18. The machine readable storage medium of claim 11, wherein the processor enables the NMF to update the NS instance via an Os-Ma-nfvo reference point.

19. A method for a network management function (NMF) of a mobile network that includes virtualized network functions, the method comprising:

generating a request for a network function virtualization orchestrator (NFVO) to update a network service (NS) instance to add a virtualized network function (VNF) instance that realizes a virtualized part of a base station or a physical network function (PNF) instance that realizes a non-virtualized part of the base station;

processing an operation result, from the NFVO, to determine a lifecycle operation occurrence identifier corresponding to the NS instance;

processing a first NS lifecycle change notification, from the NFVO, to determine a start of an NS instance update operation corresponding to the lifecycle operation occurrence identifier; and processing a second NS lifecycle change notification, from the NFVO, to determine a result of the NS instance update operation.

20. The method of claim 19, wherein the request is to update the NS instance to instantiate the VNF that realizes a centralized unit (CU) that is part of an upper layer of a next generation radio access network (NG-RAN) node or g Node B (gNB).

21. The method of claim 20, wherein the request comprises a nsInstanceId parameter that identifies the NS instance where the VNF instance is to be instantiated, and an addVnfInstance parameter that provides an existing VNF instance to be added to the NS instance.

22. The method of claim 19, wherein the request is to update the NS instance to add the PNF instance that realizes a distributed unit (DU) that is part of a lower layer of a next generation radio access network (NG-RAN) node or g Node B (gNB).

23. The method of claim 22, wherein the request comprises a nsInstanceId parameter that identifies the NS instance where the PNF instance is to be added, and a pnfInfo parameter that provides information of the PNF instance to be added to the NS instance.

24. The method of claim 19, further comprising processing a notification from the NFVO to determine that the NS instance has been updated.

25. The method of claim 19, wherein the NMF comprises network management functionality within an operation support system (OSS).

26. The method of claim 19, further comprising enabling the NMF to update the NS instance via an Os-Ma-nfvo reference point.

* * * * *